United States Patent [19]
Braun

[11] 3,924,219
[45] Dec. 2, 1975

[54] GAS DETECTION DEVICE

[75] Inventor: David L. Braun, Lake Elmo, Minn.

[73] Assignee: Minnesota Mining and Manufacturing Company, St. Paul, Minn.

[22] Filed: Apr. 19, 1974

[21] Appl. No.: 462,415

Related U.S. Application Data

[63] Continuation-in-part of Ser. No. 210,672, Dec. 22, 1971.

[52] U.S. Cl. ............... 338/34; 23/254 E; 23/255 E; 73/23 R; 200/61.03
[51] Int. Cl.² ......................................... H01C 13/00
[58] Field of Search... 338/34, 35; 23/254 E, 255 E; 340/237 R; 200/61.03; 73/19, 23 R

[56] References Cited
UNITED STATES PATENTS

| | | | |
|---|---|---|---|
| 2,741,912 | 4/1956 | Schultze | 340/237 R X |
| 2,983,587 | 5/1961 | May et al. | 23/254 E X |
| 3,144,850 | 8/1964 | Rosenberg | 340/237 R X |
| 3,200,387 | 8/1965 | Loscher | 200/61.03 X |
| 3,714,562 | 1/1973 | McNerney | 338/34 X |

*Primary Examiner*—C. L. Albritton
*Attorney, Agent, or Firm*—Alexander, Sell, Steldt & DeLaHunt

[57] ABSTRACT

A device for measuring the concentrations of a selected gaseous component in a mixture of gases comprises a detector material capable of reacting with the component to be monitored disposed in a chamber having an inlet. A porous gas flow attenuating sheet closes the end of the chamber distally, the detector substance and the mixture of gases being monitored to prevent impingement of moving gas upon said detector substance while permitting contact of ambient gas thereon. The device is useful in combination with a filter element, providing a means to monitor the remaining effective life of the filter and also as a detector useful for measuring the exposure of various articles and human beings to hazardous gases.

10 Claims, 6 Drawing Figures

GAS DETECTION DEVICE

CROSS-REFERENCE TO RELATED APPLICATIONS

This application is a continuation-in-part of my copending application, Ser. No. 210,672, filed Dec. 22, 1971.

BACKGROUND OF THE INVENTION

1. Field of The Invention

This invention relates to the detection of a gas in a mixture of gases. More specifically, this invention relates to the detection of hazardous gases, such as mercury vapor. Still more specifically, this invention relates to the measurement of the time average value of exposure to a gas by measuring the total absorption of the gas by a reactive substance over a known period of time.

It is well known that exposure to toxic gases, e.g., hydrogen sulfide or mercury vapor, even in small amounts can result in poisoning and resulting illness or even death. For example, the use of mercury in industrial environments has increased steadily as exemplified by the use of mercury in electrical circuitry, e.g., as the cathods in the electrolytic production of hydrogen gas to be used in food products. The plants, which use mercury in electrolytic cells, have an acute problem with mercury vapor due to spills of mercury which can vaporize and the exposure of mercury which results when maintenance is necessary on the electrolytic cells.

Another area which is subject to mercury contamination is dental offices and laboratories. Mercury is used extensively in the preparation of amalgams for use as dental restoratives. It is inevitable that some of the mercury liquid should be spilled on counters and floors and become entrapped in the crevices therein. The mercury problem has become even more acute since the introduction of carpeting into dental offices, because the carpet acts as a trap allowing long term vaporization of mercury liquid which is spilled on the carpet. The mercury vapor concentration will be raised whenever the carpeting is subjected to disturbances such as vacuum cleaning or footsteps.

The device can also be used to measure toxic organic and inorganic vapors such as the low molecular weight isocyanates and hydrogen sulphides. Although measurement of toxic materials is important, this device can also be used to measure normally nontoxic materials such as water vapor.

Devices for monitoring individuals must be sensitive even at low vapor concentrations and must have only a limited response dependency to the velocity conditions in which the device is used. Thus, the device should not depend upon the movement of a continuous or uniform flow of air across the reactive surface.

2. Description Of The Prior Art

Devices for the detection of mercury vapor are knonw in the prior art. One such system uses selenium and sulphur in combination to detect mercury vapor by the color change associated with the reaction of mercury vapor and selenium sulfide, U.S. Pat. No. 1,711,742. Another technique for detecting mercury vapor is disclosed in German Pat. No. 825,909 where a layer of selenium is coated on a nonconducting substrate. When the selenium layer comes in contact with mercury vapor, the nonconducting selenium forms mercury selenide which in conductive causing a decrease in resistance in the selenium layer.

A third well-known sampling technique for testing mercury vapor is by use of an atomic absorption spectrometer. This method has been widely used in prospecting for precious metals and sometimes requires that a gold amalgam be formed after which the amalgam is heated to drive the mercury into an absorption spectrometer, see U.S. Pat. Nos. 3,693,323 and 3,714,562.

Prior art detection devices generally operate by passing a moving stream of gas over the sensing element of the device. Such a device will not accurately monitor a moving individual where the velocity and direction of the gas flowing over the sensing element is constantly changing since the sensing element would be exposed to widely varying amounts of the vapor being measured.

SUMMARY OF THE INVENTION

Briefly, this invention provides a rapid, simple method for measuring the concentration of a gas in a mixture of gases. The device comprises a chamber having therewithin a detector substance which will react with the gas being measured. A porous gas flow attenuating sheet closes the end of the chamber distally the detector substance and the ambient atmosphere to minimize or prevent the bulk movement of gas to the detector substance. Thus, the amount of gas reaching the detector substance is primarily a function of binary diffusion. The invention may be made in the form of a thin badge easily worn by personnel when they are in areas of possible contamination. Periodic testing of the badges will show the time average value of exposure by virtue of the total exposure as a function of time.

BRIEF DESCRIPTION OF THE DRAWINGS

Some embodiments of the detector of this invention are illustrated in the accompanying drawing in which.

DESCRIPTION OF THE PREFERRED EMBODIMENTS

Figure 1:
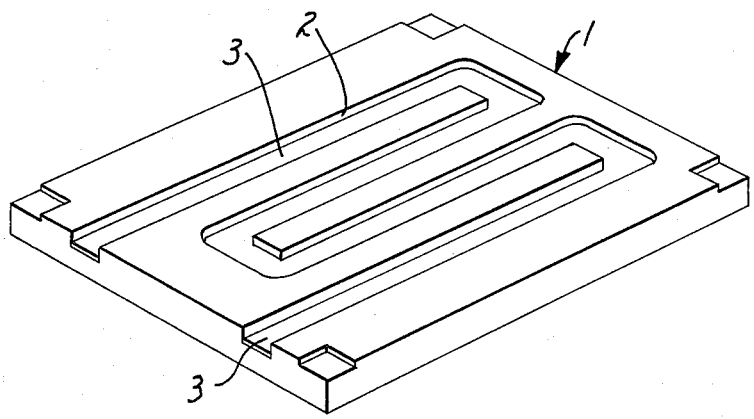
FIG. 1 is a perspective view of a detection device comprising a nonconducting substrate suitable for use as part of one embodiment of this invention having a thin, metallic film coated thereon.

In general, it is desirable to control at least three factors in making an acceptable gas sampling device. Ideally, the device should be independent of ambient velocity effects, e.g., air flow direction and turbulence, have controlled mass uptake and controllable response time. The term gas as used herein includes substances dispersed in the molecular or atomic state including those materials which can exist as solids or liquids at normal room temperature and are generally called vapors in their gaseous state.

It has been found that the effects of variable velocity which deleteriously effect a detector's accuracy can be controlled or decreased by a gas flow attenuating sheet. The attenuating sheet produces a placid layer of gas between the ambient atmosphere and the detector substance but allows diffusional transport of the gas being measured from the ambient atmosphere to the detector substance and provides the device of this invention with the desired response characteristics. The attenuating sheet can take various forms such as fine mesh wire screens, porous plates of particulate materials, nonwoven batting, microporous polymeric films, etc. Fine woven or microporous polymeric screens are one example of attenuating sheets which can reduce the velocity effect in a device of this invention and insure a relatively placid layer of gas between the opening of the device's enclosure and the interactive substance contained therein. Fine wire screens, such as 270 mesh and finer, offer little resistance and under some circumstances may increase the diffusion or mass transport of gas molecules or atoms through the screen but can at the same time provide as much as a 300 percent reduction in the effect of velocity on the reactive material.

A further type of attenuating sheet is a porous sintered plate or layer made of particulate material. One example of a particulate material is epoxy-coated spherical glass beads such as those disclosed in U.S. Pat. No. 3,175,935. The glass beads, coated with a heat-bonding epoxy, are packed in a mold and the resulting shape heat-cured. During curing, the resin flows to the contiguous points of contact of the spherical glass beads, bonding the glass beads together as a strong, porous material. Also useful are metallic particles which can be compacted and sintered using standard power metallurgy to form porous plates. Suitable metal particles include copper, brass, bronze, stainless steel, as well as other metals and alloys. The porous plate provides a relatively low mass transport attenuating sheet and also provides an excellent opportunity to screen out interferring gases by placing interacting substances within the plate. The void volume of the porous plate and pore size govern the degree of attenuation and can be changed by mixing the types of particles used, the addition of resin in the case of beads or using a filter which fills a portion of the voids.

The attenuating sheet or diffusion grating provides control of the sensitivity of the device by controlling the amount of gaseous material which passes through the means. For example a porous plate of particulate material will pass only a small fraction of the gas which would reach the detector layer if no plate were present or which would be passed by an open placid layer. Where a long-term device is wanted, or where the selected gas is present in a high concentration, mass transport can be reduced, and where quick short-term response is important or the selected gas is in low concentration, a less restrictive attenuating means can be used. Thus, the attenuating means provides a method for tailoring the response of the device to different ambient conditions.

Control of the response time is a characteristic of the placid layer formed between the attenuating means and the reactive substance. Atomic and molecular drift from a region of high ambient concentration to a low or zero concentration at the interactive substance occurs at a characteristic drift velocity. The characteristic drift velocity (CDV) is equal to twice the binary diffusion constant divided by the length over which the molecules travel (the length of the concentration gradient). Because the binary diffusion constants of various gases are relatively fixed, the primary control of response time is the length of the concentration gradient. The average time ($T$) necessary for an atom or molecule to move across a placid layer thickness ($L$) is a function of the characteristic drift velocity ($CDV$) and is related to the binary diffusion constant ($D$) by the expression:

$$T = \frac{L}{CDV} = \frac{L}{2D/L} = \frac{L^2}{2D}$$

Because of the parabolic relationship between the response time and placid layer thickness, the use of a thick placid layer to reduce velocity effects extracts a heavy penalty in response time. In choosing a gradient length which gives the desired response time, the choice of velocity attenuating sheet will be important in controlling velocity effects especially where, for quick response, a thin placid layer is used.

The detecting substances useful in the practice of this invention include materials which absorb, adsorb, react or otherwise combine with the gas being measured. Where the detecting substance undergoes a physical change, it is possible to measure the amount of material present immediately while other substances which absorb or adsorb the gas being monitored can be analyzed by standard analytical techniques, e.g., gas chromatography. Specific examples include palladium (II) chloride embedded in filter paper which changes color upon absorbing carbon monoxide (white to grey to black), thin metal films (e.g., gold) which change their resistance, exchange resins, absorbers and adsorbers which retain a gas for later gas analysis, liquids or gels which absorb the gas for gravimetric analysis. The interactive substances useful in the practice of this invention will often be specific for a particular gas or class of gases. However, it is possible to use an absorbing material and chromatographic analysis to trap and measure a large number of gaseous components simultaneously.

The enclosure or chamber of this device is made from materials which are inert in the ambient environment and which are nonreactive and nonabsorptive with respect to the gas or gases being measured. Examples of such materials are stainless steel, polyethylene, polypropylene, metals, etc. In general, injection molded plastics from preferred enclosures because of their low cost, chemical inertness and ease of manufacture. Where the reactive means are required to have an electrically conductive film disposed thereon, the enclosure or base will generally be made from nonconductive mateials.

The gas detection device of this invention can be made small, e.g., 2.5 to 5 cm. in width and length, allowing the device to be mounted on the clothing or body of a person without affecting the person's mobility. After wearing the badge for a period of time, as the person goes about his normal business, the device can be analyzed. The amount of gas detected divided by the time the device is exposed gives a time average value of exposure in addition to the cumulative exposure of the device.

Figure 2:
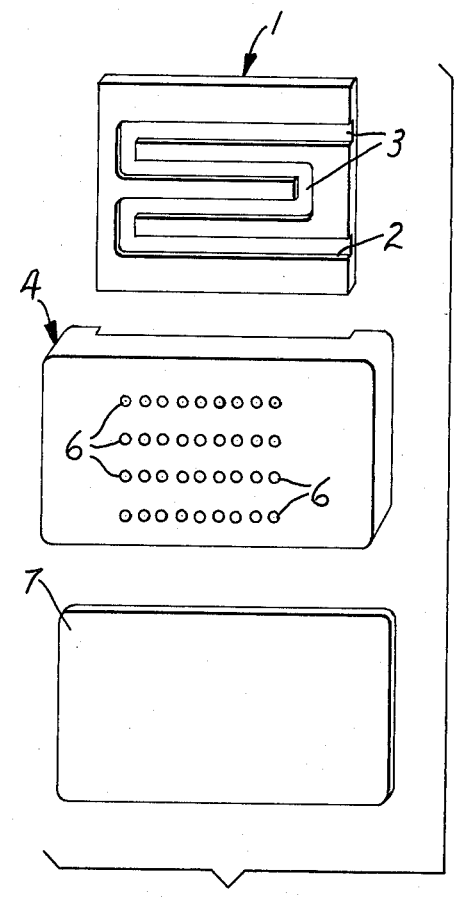
FIG. 2 is an exploded view of a personal detection badge incorporating the device of FIG. 1.

Referring to the accompanying drawing, wherein like reference numbers designate like parts, initially FIGS. 1 and 2 show one structure of the personal detection device. Reference No. 1 designates generally a detection device made of a supporting block of a nonconducting substrate material 5, with a serpentine cavity 2 formed therein, and a metallic film 3 deposited within said cavity.

A diffusion grating 4 is made with a plurality of small diffusion channels 6 in such a manner that the serpentine cavity 2 of detection device 1 can be moved into position beneath the diffusion channels 6 or may be moved so as to be covered by the solid portion of the diffusion grating, thereby protecting the metallic film from ambient conditions. The detection device 1 is mounted beneath the diffusion grating 4 by means of a backing 7, said backing being held in place by any suitable means.

The detection device 1 may be mounted on the exhaust side of a filter 12, connected by leads 13 to an external circuit 14 such that when the resistance of the detection device reaches a certain predetermined level, the warning device 16 will be activated.

The response of the mercury absorbing film will vary with the movement of air over the absorbing film. If the movement of air is constant, the detection device can be calibrated in accordance with steady state conditions; however, in the case of a personal badge, an open film would be exposed to numerous fluctuating air currents as the people being monitored performed their normal work duties. Exposure to such a fluctuating air current would result in erroneous exposure values, and consequently, the true exposure of the individual would not be known. If a gas flow attenuating screen, e.g., a diffusion grating 4 is placed over the detection device, the errors due to air movement over the metallic film can be eliminated or minimized and a smooth diffusion gradient established which is a function solely of the concentration of mercury vapor in the ambient atmosphere. This device is only slightly affected by the movement of air across the upper surface of the diffusion grating. The diffusion grating can be of numerous shapes and configurations including the use of conical channels. In general, the length to diameter ratio of the channels will be about 3 to 1 or more for large channels, e.g., greater than 0.7 mm. in diameter, but the use of fine holes, e.g., less than 0.7 mm. in diameter allows the use of thin diffusion gratings on the order of 1.4 mm.

Figure 4:
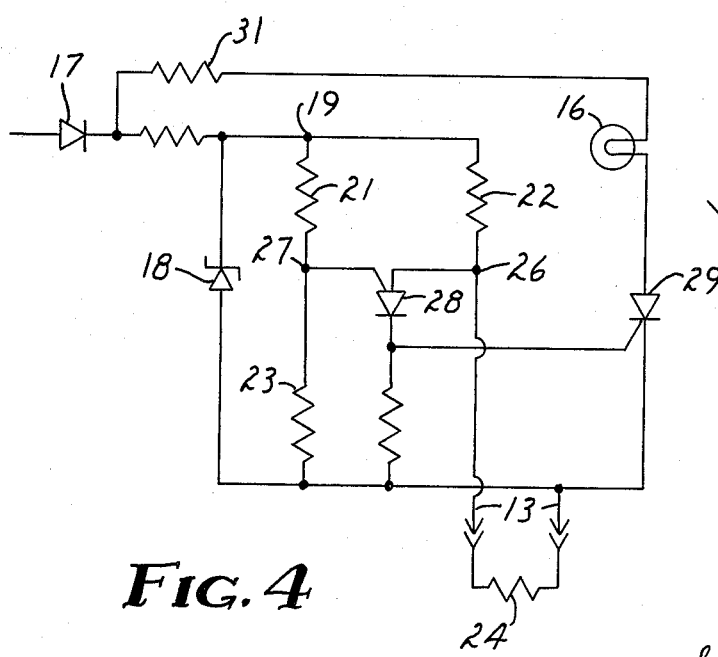
FIG. 4 is a schematic electrical wiring diagram of an illustrative warning circuit adapted for use with the apparatus of FIG. 3.

FIG. 4 shows one circuit which can be used to monitor a mercury absorption filter. In the circuit as shown, the diode 17 rectifies the external AC power source and supplies a half wave voltage to the circuitry. A zener diode 18 limits the voltage at node 19. Resistances 21, 22, 23 and 24 form a resistance bridge such that an increase of the resistance 24, the detection device will cause the voltage at node 26 to increase. When the voltage at node 26 exceeds the voltage at node 27 by a fraction of a volt, the programmable junction transistor 28 turns on and allows current to flow to the gate of the silicon controlled rectifier 29. This current turns on the silicon controlled rectifier 29 and also the warning device 16. The resistance 31 only limits the current which is allowed to pass through the warning device 16, here shown as neon lamp.

There are many combinations of resistances and electrical elements which can be used to measure when an external circuit has reached predetermined resistance level; this circuit represents only one of many which are obvious to one skilled in the art of electrical circuits.

Figure 3:
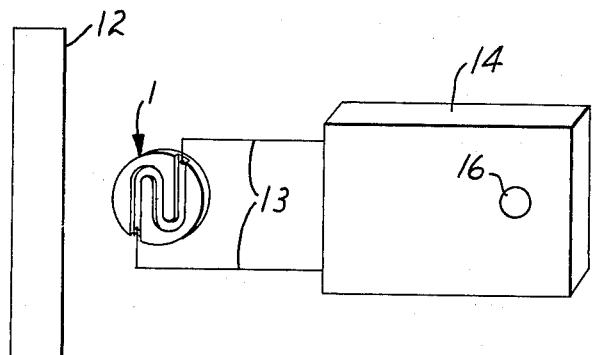
FIG. 3 is a view in elevation of a mercury absorption filter and a detection device similar to FIG. 1, said device being integrated into a warning circuit.

When a detection device similar to FIG. 2 is used to monitor a filter as shown in FIG. 3, the device is placed in the effluent gas flow exiting from the filter. The device is attached to an electrical circuit which can measure changes in a variable resistance in the detection device. Preferably, the device is calibrated and has a uniform initial resistance so the associated circuit can have fixed electrical characteristics and measure a predetermined change in the electrical resistance. If desired, detection devices of varying resistances may be used and the associated electrical system will incorporate a variable measuring system which can be calibrated to measure a percentage change in the initial external resistance furnished by the detection device. When the mercury filter has absorbed sufficient mercury vapor to lose effectiveness, the the mercury vapor will impinge on the detection device causing an increase in resistance which causes the electrical circuit to activate a warning device such as an electric lamp or buzzer.

The effluent gas flow being monitored from the filter moves at a steady rate which can be used in determining the total response necessary to activate the device. Therefore, it is not necessary to use a diffusion grating to protect the detection device from fluctuating ambient gas flow unlike the case where a detector is used to monitor personnel. It may be desirable, however, to use a diffusion grating as a means of prolonging the life of the detection device.

Figure 5:
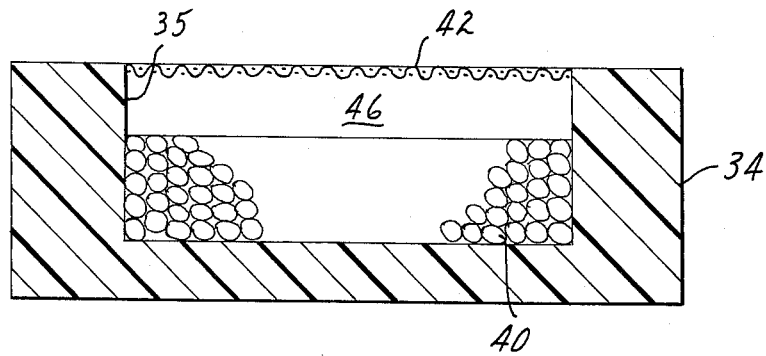
FIG. 5 is a side view in section of a further embodiment of this invention having screen mesh attenuating sheet.
Figure 6:
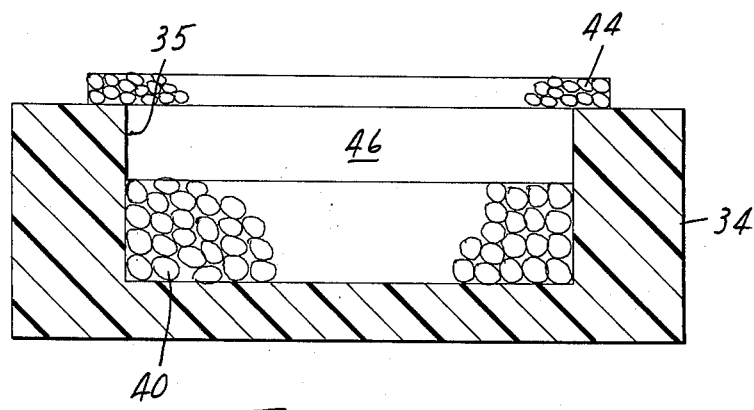
FIG. 6 is a side view in elevation of another embodiment having a porous plate formed of resin bonded glass beads, as an attenuating sheet.

FIGS. 5 and 6 show different embodiments of the detection device of this invention. An enclosure 34 having an interior chamber 35 made of a nonreactive material is formed with one open end 36 and has a portion of the chamber 35 filled with a detector substance 40 which will adsorb, absorb or otherwise react or entrap the gas to be measured.

The enclosure 34 has gas flow attenuating sheet disposed between the ambient surroundings and the detector substance. In FIG. 5 the attenuating sheet is a wire mesh screen 42 such as a 270 wire mesh screen and in FIG. 6 the attenuating sheet is a porous frit 44 of particulate material such as might be formed by resin bonded glass beads.

The attenuating sheet will allow the ambient atmosphere to pass through but prevents the free flow of ambient atmosphere into the chamber. Thus, a placid layer 46 is established between the attenuating sheet and the reactive substance.

EXAMPLES

Objects and advantages of this invention are illustrated in the following examples; however, the particular materials and amounts recited in these examples, as well as other conditions and details, should not be construed to unduly limit the scope of this invention.

In order to standardize the response characteristics of various detection devices and their associated metallic films, the following procedure and units will be used in some of the illustrative examples. For mercury vapor examples the response of the devices is determined by measuring the change in resistance of a thin gold film and calculating a "Normal Response" Unit (N). $N$ is calculated by using the formula:

$$N = 5.0 = 10^2 \frac{(\Delta R)}{R} \left(\frac{1}{tc}\right)$$

where $R$ is the initial resistance of the strip, $\Delta R$ is the change in resistance after exposure to mercury gas, $t$ is the time of exposure to mercury gas and $c$ is the concentration of mercury gas in mg Hg per cubic meter of gas.

EXAMPLE 1

A detection device of polystyrene was injection-molded with a serpentine pattern about 1/8 inch wide, about 1/32 inch deep and 6 inches in length. A thin, adherent gold film was vapor deposited on the surface of the substrate and then the surface of the substrate was abraded leaving a thin gold film resistor in the form of a serpentine pattern. Said resistor had a resistance of 1,393 ohms before exposure to mercury. After 3½ hours of exposure in a chamber containing mercury at a concentration of 0.06 mg. of mercury per cubic meter of air, the resistance was raised to 1,414 ohms, giving a normal response of 35.7 N. In an adjacent time period of 3½ hours at an average mercury concentration of 0.07 mg. of mercury per cubic meter of air, the resistance was raised to 1,439 ohms, giving a normal response of 36.4 N., showing the response characteristics of the detection device are essentially uniform for different concentrations of mercury vapor.

EXAMPLE 2

Two detectors made as in Example 1 were simultaneously exposed to air containing mercury. One device was given a forward velocity of 15 cm. per sec. while the other device remained stationary. The stationary detector showed a normal response of 14.5 N. while the moving detector had a normal response of 43 N. showing a velocity dependence of about 3 for an unprotected device.

EXAMPLE 3

The experiment was repeated with diffusion grating placed over the serpentine pattern of the detector element. Each diffusion grating had 36 diffusion channels, FIG. 3, Ref. No. 6, said channel being 0.95 cm. deep and 0.16 cm. in diameter. The response of the stationary detector was 8.6 N. and that of the moving detector 8.0 N. showing no response increase with increased velocity. The change in response was within normal experimental error limits being 8 percent. Addition of a diffusion grating eliminated or substantially reduced the variation in response of the detector elements due to the motion of air.

Two mercury vapor detectors were made by providing devices of Example 1 with diffusion gratings having 50 holes of 0.024 inch (0.06/cm.) diameter and 0.060 inch (0.15 cm.) length and testing at 50 micrograms Hg/m³ for a period of 25 hours. The response of one device which was stationary was 12.5 N. and where the gas moved across the device at 45° and 183 cm/sec. the response was 15.1 N.

The data show that the velocity dependence of this device was 15.13/12.47 or 1.21.

EXAMPLE 4

A water vapor detection device was formed from a circular, 160 mm. diameter by 22 mm., deep dish of Pyrex. The dish was filled to a depth of 2 mm. width, 30 gm. silica gel (8 mesh), and the device placed in a test chamber at 24.4 $H_2O/m^3$ for 2 minutes. The weight gain in still air was 0.050 gm. and with the air moving at 178 cm./sec. and an attack angle of 45°, the increase in weight was 0.490 gm. Thus, the velocity dependence of the open device was 0.490/.050 = 9.8.

EXAMPLE 5

Water vapor detection devices were made. A circular chamber about 0.063 cm. deep and 7.62 cm. in diameter was made in a block of aluminum. The chamber was filled with 30 grams of "Drierite" (anhydrous $CaSO_4$). A diffusion grating of "Plexiglass" (polymethylmethacrylate) 0.635 cm. thick having 275 holes 0.157 cm. in diameter by 0.635 cm. long was sealed over the chamber thus forming a placid layer.

The devices were placed in a test chamber having 17 gm. $H_2O/m^3$ of air for 3.17 hr. and air passed over the device at various attack angles. The attack angle is the acute angle between the gas flow and the face of the device.

The response of the device was measured gravimetrically. The relative weight gain is the percentage of weight gained by the $CaSO_4$.

TABLE I

| Velocity | Attack Angle | Relative Water Gain |
|---|---|---|
| Still air | (N/A) | 8.00 |
| 178 cm/sec | 90° | 24.6 |
| 178 cm/sec | 45° | 29.0 |

These tests show a velocity dependence ratio of 29.0/8.0 = 3.62. This is only about one-third the velocity dependence of an open device as shown in Example 4.

EXAMPLE 6

The circular aluminum chamber of Example 5 was filled with "Drierite" (anhydrous $CaSO_4$) and an attenuating means comprising a frit made of glass beads, such as those described in U.S. Pat. No. 3,175,935 placed over the chamber's opening.

The glass beads have a diameter of about 0.46 mm. and were consolidated with a bis-phenol-A epoxy resin. The frit, which was 6 mm. thick, was sealed over the open end of the chamber providing a placid layer between the $CaSO_4$ and the ambient atmosphere.

The devices were placed in a test chamber at 17.2 gm. $H_2O/m^3$ of air for 3.5 hours and the response of the device was measured gravimetrically as in Example 5.

TABLE II

| Velocity | Attack Angle | Relative Water Gain |
|---|---|---|
| Still air | (N/A) | 8.06 |
| 178 cm/sec | 90° | 10.0 |
| 178 cm/sec | 45° | 12.65 |

These tests show a velocity dependence ratio from still air to severe test conditions of 1.57.

EXAMPLE 7

Organic vapor detection devices were made. About 500 milligrams of Witco 18 × 40 mesh AC–4259 carbon was attached to the bottom of a chamber 3.8 cm. in diameter and 1.2 cm. deep in a steel block using pressure sensitive adhesive. A woven screen of polyester monofilament having 0.0043 cm. openings and 27 percent open area was sealed over the chamber.

The device had placid layer about 1 cm. thick between the polyester screen and the ambient atmosphere.

The devices were exposed to a 930 mg./m³ concentration of trichloroethylene vapor in air for 20 minutes. The device was positioned at an angle of 45° to the air-vapor stream moving at 100 cm./sec. velocity. This resulted in an average mass uptake of 1.10 mg. compared to a calculated mass uptake of 0.808 mg. based on the diffusion constant of trichloroethylene. Thus, the velocity increased the response only 36 percent over theoretical.

EXAMPLE 8

Organic vapor detection devices were made by replacing the polyester screen of Example 7 with a microporous polypropylene film ("Celgard 2400," said film being described in U.S. Pat. No. 3,558,764, the disclosure of which is incorporated herein by reference).

The devices were exposed to a 1000 mg./m³ concentration of trichloroethylene vapor in air for 30 minutes. The axis of the device was at an angle of 45° to the air-vapor stream which was moving at 100 cm./sec.

The devices had an average mass uptake of 1.6 mg. compared to a theoretical mass uptake of 1.36 mg. Thus, the velocity dependence of the devices was only 18 percent.

What is claimed is:

1. A device useful for measuring the amounts of at least one selected gas in an ambient gas mixture comprising:
   a shallow chamber having one open end comprised of a side of said chamber;
   a detector substance adapted to interact with the gas to be measured located within said chamber;
   a porous gas flow attenuating sheet which allows passage of ambient atmosphere closing the open end of said chamber distally to and spaced apart from said detector substance to form a relatively placid layer of gas between said ambient gas mixture and said detector substance;
   whereby the amount of said selected gas available to react with said detector substance is caused to be a function of diffusion through the placid layer of gas and is substantially independent of velocity of the gas mixture at the interface of the device with the ambient surroundings.

2. The device of claim 1 where said attenuating sheet is a fine mesh screen.

3. The device of claim 1 where said attenuating sheet is a microporous polypropylene film.

4. The device of claim 1 where said reactive substance is activated charcoal and the gas being monitored is an organic vapor.

5. The device of claim 1 where said attenuating sheet is a glass frit.

6. The device of claim 5 where said sheet has reactive substances contained therein reactive with certain gases thereby preventing said certain gases from entering the chamber.

7. A device for measuring cumulative concentrations of mercury vapor in a mixture of gases, which comprises an electrically insulating substrate having a shallow cavity therein, a thin, electrically coherent film of a metal capable of amalgamating with mercury disposed in said cavity on said substrate in elongated strip form, and a porous gas flow attenuating sheet which allows passage of ambient atmosphere over the said substrate adjacent to and covering said cavity, and spaced apart from said film of metal, to prevent impingement of moving air upon said film of metal whereby the amount of mercury vapor available to interact with the said film of metal is caused to be a function of the diffusion of said vapor and substantially independent of the velocity of the ambient air.

8. The device of claim 7 where the thin, electrically coherent film of metal is a noble metal.

9. The device of claim 7 where the thin, electrically coherent film of metal comprises a strip of metal which will amalgamate with mercury overlaid with a more noble metal which also amalgamates with mercury.

10. A device for measuring cumulative concentrations of mercury in gas, which comprises an electrically non-conductive supporting block having a shallow serpentine cavity therein; a thin, electrically coherent film of gold in elongated strip form contained in said cavity; and a diffusion grating having a plurality of diffusion channels with a length to diameter ratio of at least about 3:1 disposed over said supporting block adjacent to and coextensive with said cavity and spaced apart from said gold film strip, said diffusion grating preventing the impingement of moving air upon said gold film strip.

* * * * *